April 26, 1927.  B. R. SAUSEN ET AL  1,626,360
SPRAY COOLING
Filed Sept. 19, 1921
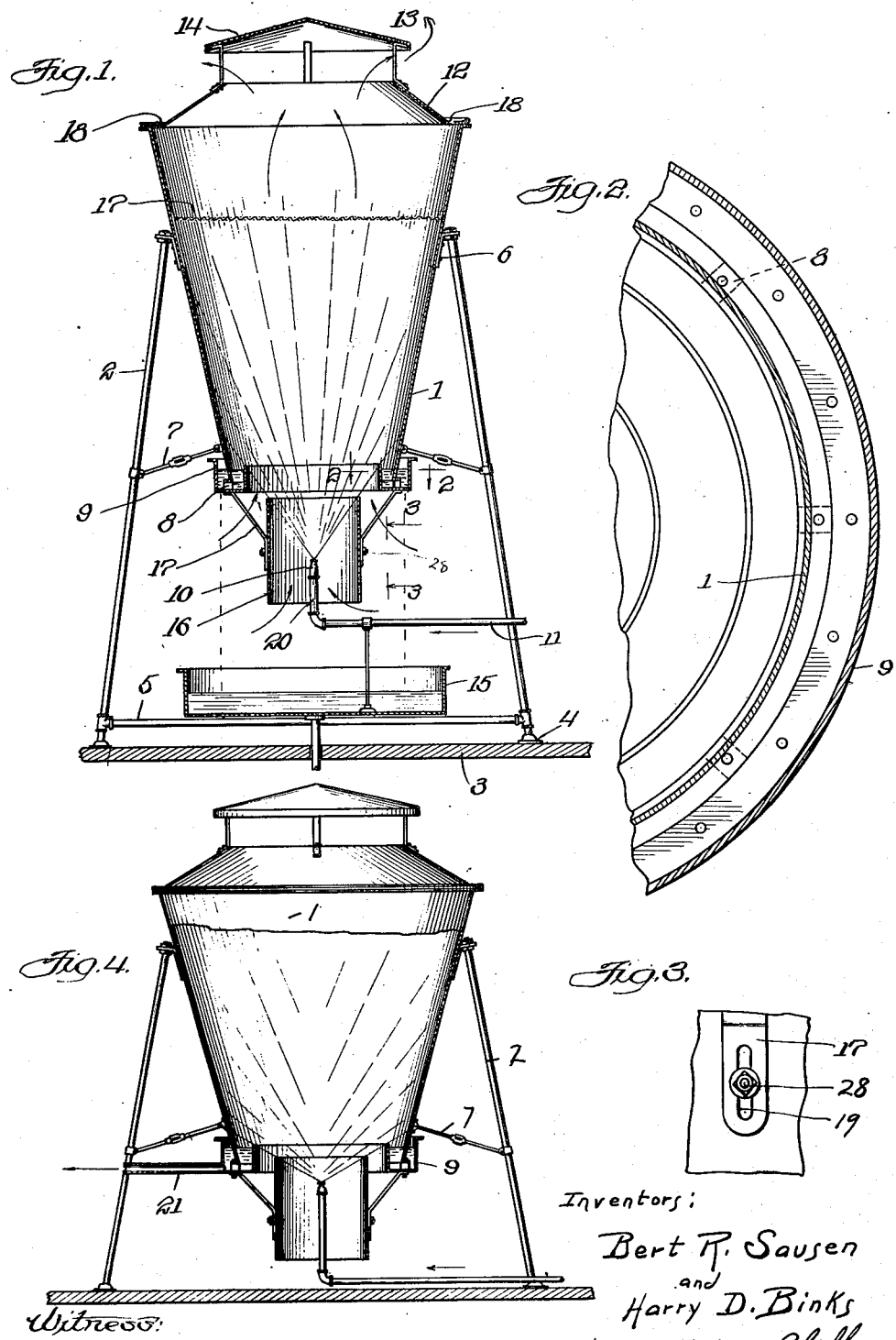
Inventors:
Bert R. Sausen
and
Harry D. Binks
by Albert Scheible
Attorney Patented Apr. 26, 1927.

1,626,360

UNITED STATES PATENT OFFICE.

BERT R. SAUSEN AND HARRY D. BINKS, OF CHICAGO, ILLINOIS, ASSIGNORS TO BINKS SPRAY EQUIPMENT CO., OF CHICAGO, ILLINOIS, A CORPORATION OF ILLINOIS.

SPRAY COOLING.

Application filed September 19, 1921. Serial No. 501,742.

In its broad aspects, our invention relates to methods and means for interchanging heat between a liquid and a gas, and aims to provide simple, compact and highly effective means which will not waste liquid and which will not be materially influenced by winds, and to employ a novel method of operation for this purpose.

In a more particular aspect, our invention relates to methods and means for interchanging heat between a liquid and air, and aims to provide a highly effective method and means for accomplishing such heat interchanging without the use of blowers or other auxiliary apparatus for producing the needed movement of air. It also aims to provide means whereby the required air movement can readily be produced by the spraying of the liquid, aims to intermingle air with the liquid spray during both the ascent and the descent of the spray, aims to prevent a wasting of the sprayed liquid, and aims to provide simple means for adjusting the apparatus to varying liquid pressures.

In one of its highly commercial applications, our invention is particularly adapted for cooling liquids (such as the water used in condenser jackets) and aims to provide a compact, easily adjusted and water-saving spray cooling appliance which will not be appreciably affected by the wind if used out of doors. Furthermore, our invention aims to provide a spray cooling appliance in which air (or other cooling gas) is moved forcibly past the spray of liquid to cause the same to intermingle with the spray, in which the rate of movement of the air is reduced during its mingling with the spray to permit of a thorough intermixing of the air with the liquid after the latter has been reduced substantially into a fine mist, and aims to produce the required movement of the air entirely by the suction due to the spray of the liquid. Our invention also aims to provide compact, inexpensive and easily erected means for combining the liquid spray and the air during their intermingling, and for catching the spray of the liquid and feeding the latter back to the source of supply. Furthermore, it aims to provide a simple means for effectively adjusting certain portions of the appliance with respect to the spray nozzles so as to adapt the appliance for use with varying pressures and different liquids, and also aims to provide liquid-returning means arranged for affording an added cooling of the liquid after the latter has been used in the form of a spray. Still further and more detailed objects will appear from the following specification and from the accompanying drawings, in which Fig. 1 is a central and vertical section through a spray tower embodying our invention.

Fig. 2 is an enlarged and fragmentary horizontal section through the annular drip pan, taken along the correspondingly numbered line in Fig. 1.

Fig. 3 is a fragmentary elevation showing the adjustable supporting of the suction collar.

Fig. 4 is a partly sectioned elevation of another embodiment of our invention, namely one in which an outlet pipe is substituted for the drip outlets in Fig. 1, and also showing the suction collar as adjusted for a wider angle of spray.

Heretofore, the water used in the condensers of mechanical refrigerating plants has commonly been cooled by spraying the same into the open air and utilizing the lower temperature of the air for cooling the water. The same practice has also been customary in connection with the cooling of the water used in the jackets of transformers and engines. In large installations, the sprays as used for such purposes have been disposed above pools or tanks of water with ample opportunity for catching the drip of the spray even in windy weather, but in smaller installations it is not feasible to employ pools for this purpose. In such smaller installations, it is customary to depend on a trough for catching the spray, and in high winds the spray is apt to be blown beyond the range of the trough, thereby interfering with the proper returning of the cooled liquid to the source of supply and often seriously hampering the operation of the mechanism in connection with which the spray cooling system is employed.

In one of its important aspects, our invention aims to provide an effective substitute for such open air spray systems and one which will operate with substantially equal effectiveness regardless of the prevailing winds. Furthermore, it aims to provide a spray cooling appliance which will require a considerably smaller amount of floor space for a given capacity than that needed for an open air spray.

Illustrative of our invention, Figs. 1 to 4 show an embodiment including a main casing 1 supported by risers 2 which are secured to a floor 3 by flanges 4, these risers being desirably connected to one another by braces 5 and connected to the casing 1 both by lugs 6 and by adjustable links 7. The casing 1 desirably has its axis vertical and preferably is substantially frusto-conical in shape with the smaller opening at its lower end and its upper end desirably supports a roof 12 carrying spaced straps 13 which support a hood 14 after the usual manner of cupola constructions. Underhanging this lower end, and desirably supported from the latter by a series of small and spaced lugs 8 is an annular drip pan 9 which has its sides extending upwardly both inside and outside of the casing and which has a bore of considerable diameter.

Mounted below the said drip pan is a spray nozzle 10, desirably supported by the pipe 11 which supplies the water or other liquid that is to be cooled. This nozzle 10 is desirably of a type affording a finely divided solid cone spray or so called "full mass spray" and is preferably located at such a distance below the drip pan 9 that the outer edge of the conical spray just clears or touches the top of the inner rim of the drip pan, as indicated in dotted lines in Fig. 1.

With the parts thus arranged, it will be evident from Fig. 1 that the conical spray produced by the upward pressure of the liquid will carry air upwardly with it through the bore of the drip pan, and since fresh air is continuously forced upwardly in this manner, the spray arrangement will cause a continuous upward current of air through the casing 1. While passing through the casing, the air is intermingled with particles of spray which gradually break up into a fine mist and which are further broken into more finely divided particles by their impact against other portions of the spray and against the interior of the casing. Being heavier than air, the resulting mist gradually descends, part of it falling through the inlet opening of the casing into a lower drip pan 15 while other parts of the drip run down the sides of the casing into the annular pan 9. Thus the mist into which the liquid is broken up intermingles with the continuously ascending current of air during both the ascent and the descent of the particles of mist, thus effecting an unusually thorough interchanging of heat between the liquid and the air.

To insure the desired continuous movement of air into the casing and out through the openings between the straps 13 of the cupola, we desirably increase the velocity of at least a part of the air before the latter reaches the liquid spray, and we preferably accomplish this by using a suction collar 16 which houses the initial diverging portion of the spray and which extends for some distance below the nozzle 10. This collar 16 is desirably so positioned that the spray just clears its upper or forward edge as shown in Fig. 1, for which purpose we desirably support the suction collar from the casing 1 by straps 17 secured to the collar by bolts 28 extending through slots 19 in the said straps (as shown in Fig. 3). With the suction collar thus mounted, the approaching of the diverging spray to the top of the collar greatly contracts the outlet opening of the collar, thereby reducing the effective size of the air passage through the collar and greatly increasing the velocity of the air drawn upward through the collar. The air passing through the annular space between the suction collar and the bore of the annular drip pan 9 does not have its velocity increased to any similar degree, so that this slower moving portion of the air in intermingling with the central air portion and with the spray prevents the production of such an air current as would forcibly project the spray through the openings in the cupola. However, irregularities in the pressure at which the water is supplied to the nozzle may tend to permit portions of the spray to be carried out beyond the casing. To avoid such a wasting of liquid, we may mount a wire screen within the casing and transversely thereof, so as to intercept and break up any large particles of liquid reaching that part of the casing, thereby permitting us to employ a shorter and less expensive casing. We may also equip the cover 12 with a circumferential trough as shown in Fig. 1, so as to catch any mist which might issue from the cupola and condense on the hood 14 or the cover 12, this trough having spaced perforations 18 through which the drip as thus caught will drain into the interior of the casing.

In employing such a spray cooling tower, the nipple 20 supporting the spray nozzle can be selected of such a length that it will support the nozzle in proper position for permitting the diverging spray to clear the inner edge of the annular drip pan, thus affording one of the adjustments needed according to the construction of the nozzle and the pressure at which liquid is supplied to the same. Then by first loosening the bolts 28 the suction collar 16 can be raised or lowered so that its upper edge also will just be cleared by the spray. In operation, the effective contraction of the outlet of the collar by the adjacent spray causes the air to increase in velocity as it passes upwardly through the collar and hence insures an adequate suction for forcing the air entirely through the casing at a rate adequate for a decided cooling of the spray in spite of the reduction in velocity due to the expanding of the air in the relatively large casing. Moreover, the suction through the collar and through the annular inlet surrounding the top of the collar appears to lower the temperature of the entering air, so that we have found this temperature to be lower at the said inlet than outside of the same and still lower within the collar.

We have also found that by thus causing the air to mingle with both the ascending and the descending spray, by laterally confining the spray to guard the same against the action of winds, and by breaking up the spray into a fine mist while within the casing, we can secure close to one hundred per cent humidity in the air issuing from the cupola, thus insuring a highly effective exchange in temperature between the air and the water. However, the degree of humidification can readily be varied if desired by raising or lowering the suction collar, and can also be increased to some extent by allowing the annular pan 9 to empty into the lower drip pan 15 through perforations in the former. If this latter plan is employed, the perforations are desirably small and widely spaced so that the water will drip in spaced streams without forming a curtain which might interfere with the desired draft of air. So also, these drip perforations are desirably placed near the outer edge of the pan 9 so that the suction of the air will not deflect the drip streams sufficiently to cause them to merge.

However, while we have heretofore described the appliance of our invention as including certain desirable features, we do not wish to be limited to the same, as the construction and arrangement can obviously be modified in many ways without departing from the spirit of our invention or from the appended claims. For example, Fig. 4 shows another embodiment in which the eaves trough on the roof and the perforations in the annular drip pan are omitted, the latter pan being emptied through a drain pipe 21, and also shows both the nozzle and the suction collar raised to correspond to a spray of wider angle. In this embodiment, the air encounters a minimum of liquid drip before reaching the initial portion of the spray, as the velocity at which the spray issues from the nozzle will not permit any compacted mist to drop through the spray into the bore of the collar, hence the velocity of the entering air is not impeded by encountering drip streams. Moreover, it will be noted that in each of the illustrated embodiments the wide lateral diverging of the spray beyond the mouth of the annular drip collar will cooperate with the said initial velocity of the spray and with the upward flaring of the casing in laterally spreading the mist so that the major portion of the resulting drip is caught in the annular drip pan.

Nor do we wish to be limited to the use of our invention in the cooling of a liquid by relatively colder air, as the same general method and means could obviously be employed with equal facility for heat interchanging between air (or other gas or vapor) and a relatively colder liquid. In either case, the confining of the spray during the heat interchanging permits us to accomplish the latter in a considerably smaller space than that which would be required in open air spraying, while the movement of the air by suction makes it unnecessary to employ a blower for this purpose.

We claim as our invention:—

1. A spray cooling appliance comprising an upright casing open at its bottom and having a ventilating opening in the upper portion thereof, upwardly directed spraying means disposed below the casing, a pair of concentric collars through which the spray is consecutively projected upwardly into the casing, and a drip chamber having the larger of the two collars as its inner wall, the casing having its bottom opening larger in diameter than the said wall and overhanging the drip chamber.

2. A spray cooling appliance comprising a casing having an inlet at its bottom and having a ventilating opening in the upper portion thereof, upwardly directed spraying means disposed below the casing, and a pair of concentric collars through which the spray is projected upwardly into the casing, the smaller diametered of the two collars being relatively long in proportion to the other collar and extending downwardly beyond the spray outlet of the spraying means.

3. A spray cooling appliance comprising an upright casing closed at its top and provided with a bottom opening, means disposed below the casing for spraying liquid upwardly into the casing, and means for causing the spray to force air upwardly into the casing; the casing having lateral apertures below its top for the exit of air and having a portion disposed below the said apertures and projecting laterally outward for catching condensate resulting from spray condensing upon the exterior of the said top, the said projecting portion overhanging a lower port of the casing and having apertures through which the said condensate can flow back into the casing.

4. A spray cooling appliance comprising an upright casing open at its lower end and having an upper air outlet; means for spraying liquid upwardly into the casing through the said lower end, an annular drip pan underhanging the lower end of the casing, and a suction collar having its upper end disposed between and spaced from both the spraying means and the drip pan, the collar being smaller in diameter than the bore of the drip pan.

5. A spray cooling appliance comprising an upright casing open at its lower end and having an upper air outlet; means for spraying liquid upwardly into the casing through the said lower end, an annular drip pan underhanging the lower end of the casing, and a suction collar having its upper end disposed between and spaced from both the spraying means and the drip pan, the collar being smaller in diameter than the bore of the drip pan, the upper edges of the suction collar and of the inner rim of the drip pan being substantially in a conical surface having its apex at the source of the spray.

6. A spray cooling appliance comprising an upright casing open at its lower end and having an upper outlet, means for spraying liquid upwardly into the casing through the said lower end, an annular drip pan underhanging the lower end of the casing, and a collar having its upper end disposed between and spaced from both the spraying means and the drip pan, the spraying means being arranged for projecting the spray of liquid in the form of a cone passing close to both the upper edge of the collar and the upper edge of the inner rim of the drip pan.

7. A spray cooling appliance embodying an upright casing having an axial opening in its bottom, a spray nozzle arranged for projecting liquid upwardly in a diverging spray coaxial with the casing, through the said bottom opening into the casing, and a collar concentric with the said axis and open at both ends and freely spaced from the said opening to permit the entry of air therebetween, the nozzle being housed by the collar.

8. A spray cooling appliance embodying an upright casing having an axial opening in its bottom, a spray nozzle arranged for projecting liquid upwardly in a diverging spray coaxial with the casing, through the said bottom opening into the casing, and a collar concentric with the said axis and open at both ends and freely spaced from the said opening to permit the entry of air therebetween, the nozzle being housed by the collar, the collar extending both upwardly and downwardly of the nozzle and having its upper end close to the outer edge of the diverging spray.

Signed at Chicago, Illinois, September 16th, 1921.

BERT R. SAUSEN.
HARRY D. BINKS.